US011958004B2

(12) United States Patent
Persson et al.

(10) Patent No.: US 11,958,004 B2
(45) Date of Patent: Apr. 16, 2024

(54) METHOD AND SYSTEM FOR PURIFICATION OF CONTAMINATED OIL

(71) Applicant: SKF RECONDOIL AB, Östersund (SE)

(72) Inventors: Thomas Persson, Sandviken (SE); Tomas Östberg, Fröson (SE); Fred Sundström, Stockholm (SE)

(73) Assignee: SKF RECONDOIL AB, Östersund (SE)

( * ) Notice: Subject to any disclaimer, the term of this patent is extended or adjusted under 35 U.S.C. 154(b) by 178 days.

(21) Appl. No.: 17/428,728

(22) PCT Filed: Feb. 3, 2020

(86) PCT No.: PCT/SE2020/050095
§ 371 (c)(1),
(2) Date: Aug. 5, 2021

(87) PCT Pub. No.: WO2020/162815
PCT Pub. Date: Aug. 13, 2020

(65) Prior Publication Data
US 2022/0016554 A1    Jan. 20, 2022

(30) Foreign Application Priority Data
Feb. 8, 2019 (SE) ..................... 1950146-9

(51) Int. Cl.
*B01D 37/02* (2006.01)
*B01D 17/02* (2006.01)
(Continued)

(52) U.S. Cl.
CPC ......... *B01D 37/02* (2013.01); *B01D 17/0202* (2013.01); *B01D 37/04* (2013.01);
(Continued)

(58) Field of Classification Search
CPC .... B01D 37/02; B01D 17/0202; B01D 37/04; B01D 39/18; B01D 2201/182;
(Continued)

(56) References Cited

U.S. PATENT DOCUMENTS

| 1,951,739 A | 3/1934 | Rodman et al. |
| 2,023,988 A | 12/1935 | Bissell et al. |

(Continued)

FOREIGN PATENT DOCUMENTS

| CA | 2747909 C | 6/2014 |
| CN | 85100831 A | 7/1986 |

(Continued)

OTHER PUBLICATIONS

Human prepared translation of Office Action dated Jul. 25, 2022, in related CN application No. 202080013038.6.
(Continued)

*Primary Examiner* — Ellen M McAvoy
(74) *Attorney, Agent, or Firm* — J-TEK LAW PLLC; Jeffrey D. Tekanic; Scott T. Wakeman (57) ABSTRACT

In a method and a system for purification of contaminated oil, the contaminated oil and a liquid separation aid are provided in a mixing tank and then mixed into a mixture. Thereafter, the mixture is filtered.

20 Claims, 2 Drawing Sheets

(51) Int. Cl.
*B01D 37/04* (2006.01)
*B01D 39/18* (2006.01)
*C10M 175/00* (2006.01)
*C10N 70/00* (2006.01)

(52) U.S. Cl.
CPC ....... *B01D 39/18* (2013.01); *C10M 175/0016* (2013.01); *C10M 175/0058* (2013.01); *B01D 2201/182* (2013.01); *B01D 2239/0407* (2013.01); *C10N 2070/00* (2013.01)

(58) Field of Classification Search
CPC .... B01D 2239/0407; C10M 175/0016; C10M 175/0058; C10M 2203/1006; C10M 175/0008; C10N 2070/00; C10N 2040/08
See application file for complete search history.

(56) References Cited

U.S. PATENT DOCUMENTS

| | | | |
|---|---|---|---|
| 2,049,014 | A | 7/1936 | Mcafee et al. |
| 3,265,212 | A | 8/1966 | Bonsall |
| 3,304,255 | A | 2/1967 | Kihei et al. |
| 3,930,988 | A | 1/1976 | Johnson |
| 4,028,226 | A | 6/1977 | Forsberg |
| 4,256,578 | A | 3/1981 | Kozar |
| 4,741,840 | A | 5/1988 | Atherton et al. |
| 4,812,234 | A | 3/1989 | Perchthaler et al. |
| 4,948,393 | A | 8/1990 | Hodson et al. |
| 4,990,237 | A | 2/1991 | Heuer et al. |
| 5,053,082 | A | 10/1991 | Flanigan et al. |
| 5,154,828 | A | 10/1992 | Schneider et al. |
| 5,269,906 | A | 12/1993 | Reynolds et al. |
| 5,587,065 | A | 12/1996 | Burns |
| 5,948,242 | A | 9/1999 | Ohsol et al. |
| 5,948,271 | A | 9/1999 | Wardwell et al. |
| 5,976,357 | A | 11/1999 | Stroem et al. |
| 6,013,174 | A | 1/2000 | Kovacs |
| 6,074,549 | A | 6/2000 | Cochrane et al. |
| 6,132,630 | A | 10/2000 | Briant et al. |
| 6,191,077 | B1 | 2/2001 | Baumgartner et al. |
| 6,379,549 | B1 | 4/2002 | LePoder et al. |
| 6,527,960 | B1 | 3/2003 | Bacon et al. |
| 6,555,014 | B1 | 4/2003 | Bremer et al. |
| 8,816,105 | B2 | 8/2014 | Ristolainen et al. |
| 10,493,383 | B2 | 12/2019 | Teodorescu |
| 10,995,279 | B2 | 5/2021 | Sundström et al. |
| 11,130,075 | B2 | 9/2021 | Sundström et al. |
| 2003/0000895 | A1 | 1/2003 | Hensley et al. |
| 2006/0000787 | A1 | 1/2006 | Galasso et al. |
| 2006/0283807 | A1 | 12/2006 | Owen |
| 2007/0241030 | A1 | 10/2007 | Strom |
| 2009/0078632 | A1 | 3/2009 | Gallo et al. |
| 2011/0174695 | A1 | 7/2011 | Goldman |
| 2011/0213169 | A1 | 9/2011 | Ristolainen et al. |
| 2013/0098805 | A1 | 4/2013 | Bjornson et al. |
| 2014/0224640 | A1 | 8/2014 | Fincher et al. |
| 2014/0332473 | A1 | 11/2014 | Haberman et al. |
| 2015/0072850 | A1 | 3/2015 | Derrick et al. |
| 2015/0152340 | A1 | 6/2015 | Cherney et al. |
| 2015/0224431 | A1 | 8/2015 | Wase |
| 2015/0265955 | A1 | 9/2015 | Kanchi et al. |
| 2015/0322348 | A1 | 11/2015 | Dasgupta |
| 2016/0052799 | A1 | 2/2016 | Grave et al. |
| 2016/0122209 | A1 | 5/2016 | Newman, Jr. |
| 2016/0177198 | A1 | 6/2016 | Mao |
| 2016/0264442 | A1 | 9/2016 | Knoop |
| 2017/0029716 | A1 | 2/2017 | Dasgupta |
| 2017/0190985 | A1 | 7/2017 | Matza |
| 2020/0056102 | A1* | 2/2020 | Sundström ............. B01D 21/30 |
| 2020/0230520 | A1 | 7/2020 | Sundström et al. |
| 2021/0101094 | A1* | 4/2021 | Sundström ......... B01D 21/0093 |
| 2022/0016554 | A1* | 1/2022 | Persson ............ C10M 175/0016 |
| 2022/0096976 | A1* | 3/2022 | Mineo .................. D04H 1/5418 |
| 2022/0111317 | A1* | 4/2022 | Sundström .............. F16N 99/00 |
| 2023/0143845 | A1* | 5/2023 | Enquist ................ B01D 17/047 210/650 |
| 2023/0182050 | A1* | 6/2023 | Oestberg ................ B01D 35/30 73/64.56 |

FOREIGN PATENT DOCUMENTS

| | | |
|---|---|---|
| CN | 102925275 A | 2/2013 |
| CN | 104662139 A | 5/2015 |
| CN | 105457606 A | 4/2016 |
| CN | 205133522 U | 4/2016 |
| DE | 19522596 A1 | 1/1997 |
| EP | 0693544 A3 | 5/1996 |
| EP | 1561797 A1 | 8/2005 |
| EP | 2181744 A1 | 5/2010 |
| EP | 2900798 B1 | 11/2017 |
| ES | 2374247 A1 | 2/2012 |
| FI | 20105121 A | 8/2011 |
| GB | 1041703 A | 9/1966 |
| GB | 1294861 A | 11/1972 |
| GB | 1450673 A | 9/1976 |
| GB | 2107347 A | 4/1983 |
| GB | 2334034 A | 8/1999 |
| JP | S60135483 A | 7/1985 |
| JP | 2001239111 A | 9/2001 |
| JP | 2016161464 A | 9/2016 |
| WO | 9840148 A1 | 9/1998 |
| WO | 2014049060 A1 | 4/2014 |
| WO | 2016095009 A1 | 6/2016 |
| WO | 2017196234 A1 | 11/2017 |
| WO | 2018199837 A1 | 11/2018 |
| WO | 2018199838 A1 | 11/2018 |
| WO | 2018199839 A1 | 11/2018 |
| WO | 2020162815 A1 | 8/2020 |
| WO | 2020162816 A1 | 8/2020 |

OTHER PUBLICATIONS

Chemistry and Technology of Oils, China Light Industry Press, Jun. 30, 2001, pp. 664-665, with translation.
Office Action from the Chinese Patent Office dated Feb. 24, 2023 in related Chinese application No. 202080012840.3, and translation thereof.
Toshio Sakurai, "Petroleum Product Additives", pp. 432-433, Petroleum Industry Press (Nov. 1980), and translation thereof prepared by the Petroleum Product Additives Translation Group.
Unpublished U.S. Appl. No. 17/428,688.
Communication dated Jul. 21, 2022 in related European application No. 20 706 024.5 and examined claims 1-16.
Communication dated Jul. 25, 2022 in related European application No. 20706852.
Office Action and Search Report from the Chilean Patent Office dated Aug. 18, 2022 in related Chilean application No. CL 202102034.
Office Action and Search Report from the Chilean Patent Office dated Aug. 18, 2022 in related Chilean application No. CL 202102033.
Office Action and Search Report from the Chinese Patent Office dated Jul. 25, 2022 in related Chinese application No. 202080013038.6, and translation thereof.
Office Action and Search Report from the Chinese Patent Office dated Jul. 29, 2022 in related Chinese application No. 202080012840.3, and translation thereof.
International Search Report and Written Opinion for parent application No. PCT/SE2020/050095.
Office Action and Search Report from the Swedish Patent Office dated Aug. 1, 2019 in related Swedish application No. 1950146-9.
Handbook of Thermal Engineering vol. 4 Power Plant Chemistry, Xi'an Institute of Thermal Engineering, Ministry of Energy, Water Conservancy and Electric Power Press (1993) p. 615, and English translation thereof.
Office Action from the Chinese Patent Office dispatched Feb. 17, 2023, in related Chinese application No. 202080013038.6, and English translation thereof.
Office Action from the Chinese Patent Office dispatched Jul. 12, 2023, in related Chinese application No. 202080012840.3, and English translation thereof.

(56) References Cited

OTHER PUBLICATIONS

Office Action from the Chinese Patent Office dispatched Jul. 14, 2023, in related Chinese application No. 202080013038.6, and English translation thereof.
Regeneration of Waste Lubricating Oil, Information Office of the Comprehensive Research Institute of the Academy of Petrochemical Sciences, Fuel Chemical Industry Publishing House (1974), p. 74, and English translation thereof.
Waste Oil Recycling Process, edited by Li Jiwu et al., China Railway Publishing House (1984) pp. 153-154, and English translation thereof.

* cited by examiner

METHOD AND SYSTEM FOR PURIFICATION OF CONTAMINATED OIL

CROSS-REFERENCE

This application is the U.S. National Stage of International Application No. PCT/SE2020/050095 filed on Feb. 3, 2020, which claims priority to Swedish patent application no. 1950146-7 filed on Feb. 8, 2019.

TECHNICAL FIELD OF THE INVENTION

The present invention relates to a method and a system for purification of Oil.

BACKGROUND OF THE INVENTION

Purification of contaminated oil, such as for example mineral oil, industrial oils, processing oils or hydraulic oils, is important for the possibility to reuse the oils and therefore an important factor for the environmental future and the limited nature resources of oils. The contaminated oil can be purified, or recovered, by means of a liquid two-phase separation process, wherein a liquid separation aid is added to the oil and mixed therewith. Impurities will be captured by the separation aid and will accumulate for example in a bottom phase.

There is still a need to improve the purification process for contaminated oil.

SUMMARY

It is an object of the present invention to provide an improved method and system for the purification of oil.

This is achieved in a method, a system and a computer program product according to the independent claims.

According to one aspect of the invention a method for purification of oil is provided. Said method comprises the steps of:
 providing contaminated oil and a liquid separation aid to a mixing tank;
 mixing said separation aid and contaminated oil into a mixture; and
 filtering said mixture.

According to another aspect of the invention a system for purification of oil is provided. Said system comprises:
 a mixing tank, said mixing tank comprising a mixing device, at least one inlet for receiving contaminated oil and liquid separation aid and at least one outlet for transferring a mixture of contaminated oil and separation aid out from the mixing tank;
 a separation aid dosing device connected to an inlet of said mixing tank for providing liquid separation aid into said mixing tank; and
 a filtering arrangement connected to the at least one outlet of the mixing tank, whereby said mixture of contaminated oil and separation aid is filtered by said filtering arrangement when transferred out from the mixing tank.

According to another aspect of the invention a computer program product comprising instructions which, when executed in a processor in a control device in a system for purification of oil, cause the control device to perform the method as described above.

Hereby, by filtering the mixture of contaminated oil and separation aid directly, without waiting for the separation aid and contaminations to sediment to a bottom phase, the purification process is much speeded up and valuable time is saved. Furthermore the separation aid contributes to the filtration efficiency. The filter and the separation aid cooperate during the filtering. Contaminations in the contaminated oil are attached to the separation aid during the mixing whereby larger aggregates of separation aid and contaminations are formed. Also very small sized contamination particles, such as nano sized particles are attached to these aggregates. These large aggregates are then trapped in the filter and any possibly remaining free contaminations in the oil can attach to separation aid and separation aid and contamination aggregates which are trapped in the filter during the filtering step. Hereby, the filter does not necessarily need to be a fine filter, i.e. a filter which is classified as removing the smallest particles but also other filters which are cheaper can be used and still a very good filtration can be achieved where also very small sized contamination particles will be effectively filtered away by the combined effect of the separation aid and the filter. Hereby a relatively simple and cheap filter may be used for this invention and still an exceptional degree of purification can be achieved according to the invention. However, fine filters can of course also be used in this invention. Hereby both efficiency and quality in the oil purification process are improved.

In one embodiment of the invention said step of filtering comprises filtering said mixture through a depth filter. The filtering arrangement comprises hereby a depth filter. A depth filter, also called a filter cake, is a filter which can retain impurities within a bulk structure of the filter medium in contrast to conventional thin layer surface filters which only filter at the surface. The depth filter will absorb both separation aid, aggregates of separation aid and contaminations and free contaminations and the absorbed separation aid and aggregates of separation aid and contaminations will contribute to the filtering efficiency and will improve possibility to catch also very small contamination particles from the oil. Separation aid, separation aid with attached contaminations and contaminations will not pass the filter cake but will instead be integrated in the filter cake and be a part of the filter. Pure oil is however passing through the filter cake. The fact that both separation aid and aggregates of separation aid and contaminants make up part of the filter cake together with the filter cake material will improve the filter efficiency when the rest of the mixture of contaminated oil and separation aid later is filtered through the depth filter cake. Hereby a very effective filtering of the contaminated oil is provided. The separation aid is designed for attracting contaminations and therefor the filter efficiency is improved. The combination separation aid and depth filter will provide an effective oil purification and also very small contamination particles can be filtered by this filtering method. The depth filter is easy to change between batches of oil to purify. Furthermore an automation of the process can easily be achieved, both for the building up of the filter cake and for the changing of the filter. Furthermore, if for example a cellulose fiber powder is used for the building of a filter cake, the size, i.e. the depth of the depth filter can very easily be changed from case to case by just adopting an amount of added cellulose fiber powder. Hereby a very flexible and effective oil purification method and system is provided.

In one embodiment of the invention said depth filter comprises a cellulose fiber powder and a carrier paper.

In one embodiment of the invention said step of filtering comprises the steps of:
 building a depth filter by circulating a mix of cellulose fiber powder and filter building oil over a carrier layer and possibly adding more cellulose fiber powder during circulation until a filter cake of the depth filter is large enough for filtering the mixture of contaminated oil and separation aid;

filtering the mixture through said built depth filter.

In one embodiment of the invention said step of filtering comprises the steps of:

transferring first only a part of said mixture of separation aid and contaminated oil from the mixing tank to a filtering arrangement;

building a depth filter by adding a cellulose fiber powder to said part of said mixture and circulating said part of said mixture with added cellulose fiber powder over a carrier layer provided in the filtering arrangement and possibly adding more cellulose fiber powder during circulation;

transferring the rest of said mixture to said filtering arrangement; and filtering the rest of the mixture through the built depth filter.

In one embodiment of the invention the step of building a depth filter comprises adding an amount of cellulose fiber powder which is at least 1.5 times the weight of the separation aid provided to (in) the mixing tank or within the interval of 1.5-4 times the weight of the separation aid provided to (in) the mixing tank.

In one embodiment of the invention said filtering arrangement comprises:

a cellulose fiber mixing vessel arranged for receiving a filter building oil and a cellulose fiber powder;

a cellulose fiber source connected to the cellulose fiber mixing vessel; and a carrier layer connected to the cellulose fiber mixing vessel such that a content in the cellulose fiber mixing vessel can be circulated over the carrier layer to build a depth filter on the carrier layer, whereby the filtering arrangement is configured to add cellulose fiber powder from the cellulose fiber source to the cellulose fiber mixing vessel during the circulation until a filter cake of the depth filter is large enough for filtering the mixture of contaminated oil and separation aid provided in the mixing tank.

In one embodiment of the invention said cellulose fiber mixing vessel is connected to an outlet from the mixing tank and said system is configured to transfer first only a part of the mixture from the mixing tank to said filtering arrangement and transfer the part of the mixture to said cellulose fiber mixing vessel whereby said part of the mixture will be the filter building oil and wherein said filtering arrangement is configured to add a cellulose fiber powder from the cellulose fiber source to the part of the mixture in the cellulose fiber mixing vessel and circulating said part of said mixture with added cellulose fiber powder over the carrier layer for building up a depth filter and wherein the system is configured for transferring the remaining part of the mixture from the mixing tank to the filtering arrangement and filtering it through the built depth filter.

In one embodiment of the invention said filtering arrangement is configured to add an amount of cellulose fiber powder to the cellulose fiber mixing vessel during building of a depth filter which is at least 1.5 times the weight of the separation aid provided to (in) the mixing tank or within the interval of 1.5-4 times the weight of the separation aid provided to (in) the mixing tank.

In one embodiment of the invention the method further comprises the step of measuring a degree of contamination of the contaminated oil provided to the mixing tank and wherein the step of building a depth filter comprises adding an amount of cellulose fiber powder which is dependent on the measured degree of contamination of the contaminated oil provided to the mixing tank. In this embodiment said system comprises a sensor for measuring a degree of contamination of the contaminated oil provided to the mixing tank and wherein said filtering arrangement is configured to adapt an amount of cellulose fiber powder provided from the cellulose fiber source to the cellulose fiber mixing vessel in dependence on the measured degree of contamination of the contaminated oil provided to the mixing tank.

In one embodiment of the invention the method further comprises the step of warming the contaminated oil and separation aid when provided into the mixing tank. The system comprises in this embodiment a heating device provided to the mixing tank for warming the contaminated oil and separation aid in the mixing tank.

DETAILED DESCRIPTION OF EMBODIMENTS

Figure 1:
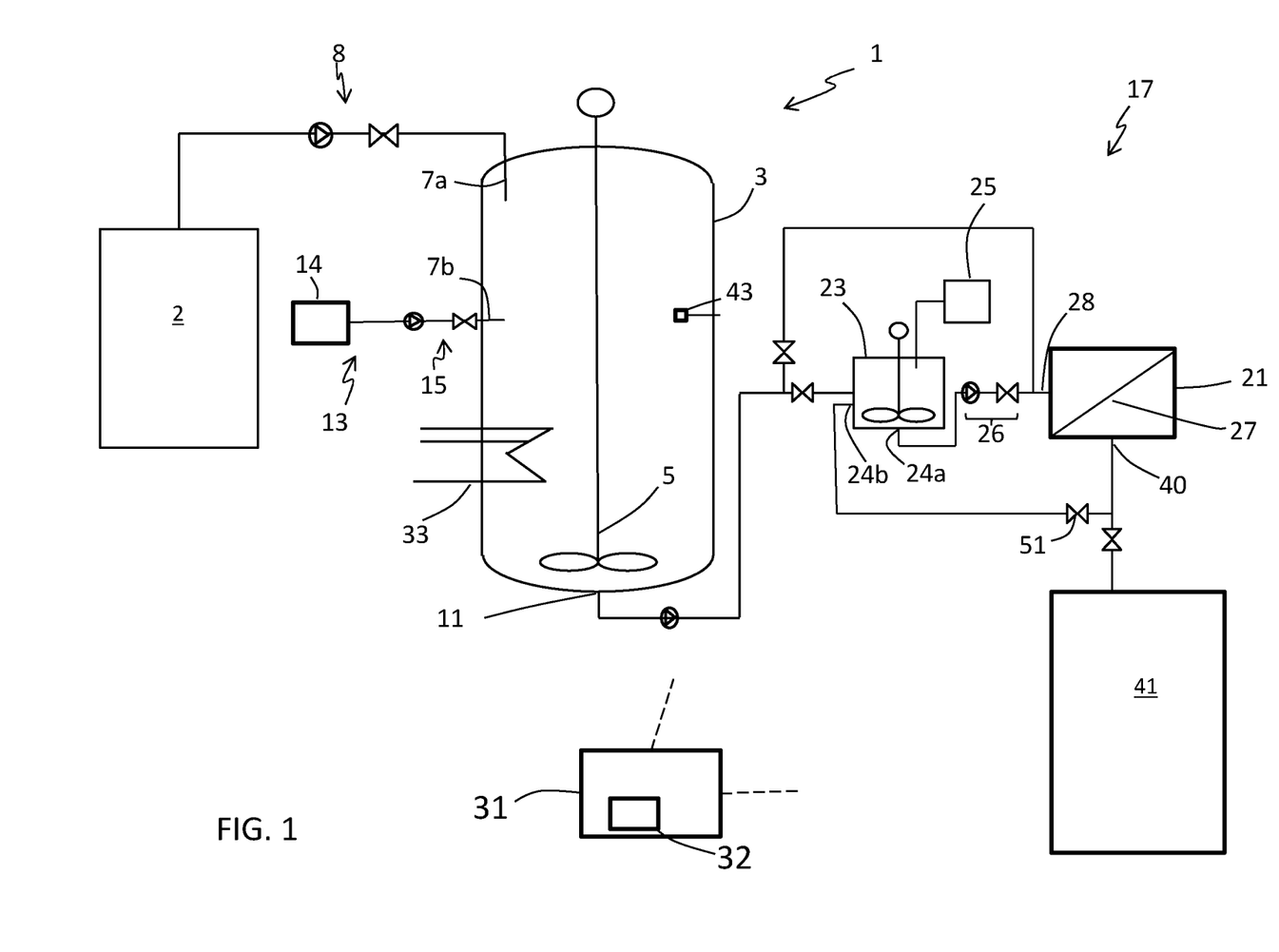
FIG. 1 shows schematically a system for purification of oil according to one embodiment of the invention.

FIG. 1 shows schematically a system 1 for purification of oil according to one embodiment of the invention. The system 1 comprises a mixing tank 3.

Said mixing tank comprises a mixing device 5 for mixing the content in the mixing tank 3 and at least one inlet 7a, 7b for receiving contaminated oil to be purified and separation aid. Contaminated oil and separation aid can be provided into the mixing tank 3 through one and the same inlet but in this embodiment two separate inlets, a first inlet 7a and a second inlet 7b are shown. A feed tank 2 is connected to the first inlet 7a via a feed pump and valve 8. The feed tank 2 comprises contaminated oil to be purified. The system 1 could as well comprise more than one feed tank 2. The system 1 comprises further a separation aid dosing device 13 comprising a separation aid tank 14 and a separation aid pump and valve 15. The separation aid dosing device 13 is in this embodiment connected to the second inlet 7b of the mixing tank 3. Hereby contaminated oil and separation aid can be provided to the mixing tank 3 and can be mixed inside the mixing tank 3 by the mixing device 5 into a mixture. A heater 33 is provided in this embodiment to the mixing tank 3 but this may not be necessary. Heating the mixture of contaminated oil and separation aid may improve efficiency in purification.

The use of a separation aid, also called a chemical booster, for capturing contaminations/impurities in contaminated oil has been described before. A liquid separation aid is added to the oil and mixed therewith and impurities in the oil will be captured by the separation aid. The separation aid is substantially insoluble in the oil, forming a two phase mixture upon mixing and the separation aid attracts impurities in the oil during mixing of oil and separation aid. The separation aid will by chemical interactions absorb contaminating solids, or dissolved impurities in the contaminated target oil.

The separation aid should be liquid at the temperature at which the process is carried out. The separation aid composition should be substantially insoluble in the contaminated target oil, forming a two-phase mixture upon mixing with the contaminated oil. The liquid separation aid can also have a density different from that of the contaminated oil to be purified.

The separation aid is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid or the dissolved impurities in the contaminated target oil. In instances where the separation aid has a higher density than the oil the separation aid will at a gravity separation form a lower phase together with the solid and/or dissolved impurities. In instances where the separation aid has a lower density than the contaminated target oil, it will form an upper phase on gravity separation.

The liquid separation aid for use in the invention can be made up based on the following components: a) a polar polymer; b) a hydrotrope/solubilizer; and, c) a co-tenside.

Suitable separation aids with the properties described above, that can be used in the inventive process, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities in to the separation aid.

One example of a separation aid which can be used in this invention comprise: a) at least one polar polymer not soluble in oil and with a higher density than the oil, such as polyethylene glycol with an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric Co-surfactant, such as an propionate type e.g. Ampholak YJH-40 (Akzo Nobel) which is a sodium caprylimino dipropionate.

The mixing tank 3 comprises furthermore at least one outlet 11 for transferring a mixture of contaminated oil and separation aid out from the mixing tank 3.

The system 1 according to the invention comprises furthermore a filtering arrangement 17 connected to the at least one outlet 11 of the mixing tank 3. Hereby said mixture of contaminated oil and separation aid is filtered by said filtering arrangement 17 when transferred out from the mixing tank 3. According to the invention the mixture of contaminated oil and separation aid is filtered instead of waiting for a sludge phase to sediment to a bottom of the mixing tank and only filtering an oil phase. The filtering is provided almost directly after mixing of the contaminated oil and the separation aid.

Hereby time is saved and a more effective purification process is achieved. The method according to the invention comprises a step of filtering the mixture and this is performed in the filtering arrangement 17. In this step both separation aid and contaminations from the contaminated oil will be filtered away and purified oil will be collected in a pure oil tank 41 which is connected to a filter outlet 40 from the filtering arrangement 17. The separation aid will during the mixing with the contaminated oil in the mixing tank 3 attract contaminations, even very small sized contamination particles, and these aggregates of separation aid and contaminations will be caught by the filter. Any possibly remaining free contamination particles can also be caught by the filter or by separation aid or aggregates of separation aid and contaminations already caught in the filter. Hereby a very effective purification process is provided according to the invention.

In some embodiments of the invention said filtering arrangement 17 comprises a depth filter 21. A depth filter, also called a filter cake, is a filter which can retain impurities within a bulk structure of the filter medium in contrast to conventional thin layer surface filters which only filter at the surface. The depth filter will absorb separation aid, aggregates of separation aid and contaminations and contaminations and the absorbed separation aid and aggregates of separation aid and contaminations will contribute to the filtering efficiency and will improve possibility to catch also very small contamination particles from the oil. Separation aid, separation aid with attached contaminants and contaminants will not pass the filter cake but will instead be integrated in the filter cake and be a part of the filter. Pure oil is however passing through the filter cake. The depth filter is easy to change between batches of oil to purify. Furthermore an automation of the process can easily be achieved, both for the building up of the filter cake and for the changing of the filter. Furthermore, if for example a cellulose fiber powder is used for the building of a filter cake, the size, i.e. the depth of the depth filter can very easily be changed from case to case by just adopting an amount of added cellulose fiber powder. Hereby a very flexible and effective oil purification method and system is provided.

In one embodiment of the invention the depth filter 21 can be built up by circulating a mix of cellulose fiber powder and a filter building oil over a carrier paper 27 and possibly adding more cellulose fiber powder during circulation until a filter cake of the depth filter 21 is large enough for filtering the mixture of contaminated oil and separation aid. In one embodiment of the invention the filter building oil is a part of the mixture of contaminated oil and separation aid provided in the mixing tank 3. In this embodiment, which is shown in FIG. 1, a part of the mixture is first transferred to the filtering arrangement 17 for being used for building the depth filter 21 and then the rest of the mixture in the mixing tank 3 is transferred to the filtering arrangement 17 and is filtered through the built depth filter 21. However, in other embodiments another oil can be used as filter building oil for building the depth filter 21. For example oil could be taken directly from the feed tank 2 or from another source.

In other embodiments of the invention the depth filter can for example be a commercially available cellulose depth filter or cartridge with high dirt-holding capacity (e.g. CC Jensen, Europafilter, JDI Inc, Lubrigard Ltd, Baldwin, Parker, Eaton). Another alternative would be a dry application of cellulose fiber powder on a carrier paper without the pre mixing of the powder in a filter building oil. This could be done during the process or by prefilling a cartridge or container in advance with a suitable cellulose fiber powder. The fiber sizes and the amount of cellulose fiber powder can then be adapted for different applications, for example for different types of contaminated oil.

In the embodiment of the invention which is shown in FIG. 1, where a part of the mixture from the mixing tank 3 is used as filter building oil, the filtering arrangement 17 comprises a cellulose fiber mixing vessel 23 which is connected to an outlet 11 from the mixing tank 3 for receiving a part of the mixture from the mixing tank 3. The filtering arrangement 17 comprises further a cellulose fiber source 25 which is connected to the cellulose fiber mixing vessel 23 and a carrier layer 27 which is connected to the cellulose fiber mixing vessel 23 such that a content in the cellulose fiber mixing vessel can be circulated over the carrier layer 27 to build a depth filter 21 on the carrier layer.

The filtering arrangement 17 is configured to add cellulose fiber powder from the cellulose fiber source 25 to the cellulose fiber mixing vessel 23 during the circulation until a filter cake of the depth filter 21 is large enough for filtering the mixture of contaminated oil and separation aid provided in the mixing tank 3. A vessel outlet 24*a* from the cellulose fiber mixing vessel 23 is connected via a pump and valve 26 to a filter inlet 28 of the carrier layer 27 and a filter outlet 40 of the carrier layer 27 is connected back to a vessel inlet 24*b* of the cellulose fiber mixing vessel 23 via a valve 51. Hereby the content of the cellulose fiber mixing vessel 23 can be circulated through the carrier layer 27. Furthermore cellulose fiber powder can be added in the cellulose fiber mixing vessel 23 from the cellulose fiber source 25 for each circulation until a suitably sized filter cake has been built up on the carrier layer 27. The size of the filter cake should be based on the amount of contaminated oil to be purified and possibly also a degree of measured contamination of the contaminated oil. One or more sensors 43 could be provided in the mixing tank 3 for measuring degree of contamination or sample could be retrieved from the mixing tank 3 for external measuring.

The amount of cellulose fiber powder to be used for building the depth filter can also be based at least partly on the amount of separation aid provided to the mixing tank 3. For example an amount of cellulose fiber powder which is added to the cellulose fiber mixing vessel 23 during building up of a depth filter 21 can be at least 1.5 times a weight of the separation aid provided into the mixing tank 3 or within the interval of 1.5-4 times the weight of the separation aid provided to the mixing tank.

A size of the cellulose fibers in the cellulose fiber powder can also be chosen for providing good oil purification efficiency. A suitable cellulose fiber powder may have a bulk density within the interval of 30-220 g/l and a fiber size distribution which is within 30%-90%>32 µm and 0-30%>90 µm (method: Alpine air draft sieve).

When the depth filter 21 has been built up the system 1 is configured for transferring the remaining part of the mixture from the mixing tank 3 to the filtering arrangement 17 and filtering it through the built depth filter 21.

A control system 31 is also provided in this embodiment of the system 1. The control system 31 is connected to pumps, valves and sensors in the system for allowing control of the system. The connections between the control system 31 and all the pumps, valves and sensors in the system are not shown. They are just illustrated by two dotted lines from the control system 31. The connections could be both wired connections or wireless connections. The control system 31 can control for example amount of cellulose fiber powder provided into the cellulose fiber mixing vessel 23 during building of a depth filter 21 and times of circulation of the filter building oil and cellulose fiber powder over the carrier layer 27. The control system 31 may furthermore also control pumps and valves for feeding content in and out from the mixing tank 3.

An advantage with depth filtering is a high dirt holding capacity without clogging due to greater total filter mass. Using cellulose fiber powder as filter medium enables absorption and removal of both polar liquid separation aid and water together with solid particles. By decreasing the filtering rate the contact time will increase giving a high separation efficiency.

In one embodiment of the invention the filtering arrangement 17 is configured for providing a new depth filter for each batch of mixture of contaminated oil and separation aid to be purified received from the mixing tank 3. This provides the advantage that a new fresh depth filter is used each time. A depth filter will also be very effective for filtering out very small particles, here called micro and nano sized particles which are in the size of µm or smaller. When reusing an industrial oil over and over again it will become more and more important to also be able to get rid of the smallest particles when purifying the oil for the reuse. Otherwise the amount of the smallest particles will grow and they will become an increasing problem in the oil the more times the oil has been purified for reuse. The combination of the separation aid as used in the present invention for the purification of the oil and the use of a depth filter is especially effective for the removal of the smallest contamination particles in the oil because separation aid and aggregates of separation aid and contaminations will be absorbed in the depth filter, possibly in a top layer of the depth filter. The separation aid itself which is absorbed in the depth filter will during the filtering of the rest of the mixture of contaminated oil and separation aid attract and bind possibly remaining free contaminations.

Even the smallest micro and nano sized particles will to a high degree be filtered by the method according to the invention. When mixing separation aid with contaminated oil the separation aid attracts the contaminations and even the smallest sized contamination particles can be bound to the separation aid. Therefore a large amount of the contaminations will be bound to separation aid in aggregates which are large and which easily get trapped in the filter. Hereby, the filter does not necessarily need to be a fine filter, but can be a cheaper type of filter. The filtration quality will still be very good and also very small contamination particles will be filtered away. Any possibly remaining free contaminations can also get caught, as explained above, by the help of the separation aid and aggregates of separation aid and contaminations which have been absorbed in the depth filter. The forcing of the mixture of contaminated oil and separation aid through the depth filter can be provided in different ways, for example by providing a pressure from above or a vacuum from below the carrier layer. After the filtering of one batch of contaminated oil the depth filter can be disposed of and a new can be provided by the same procedure as described above. This type of depth filter using a cellulose fiber powder for building a depth filter is a very cost effective type of filtering. Furthermore it is a very flexible filtering method because the thickness of the filter can be easily adapted from time to time by changing amount of cellulose fiber powder to add for building the filter. It is also very easy to change filter from time to time, for example between each batch of contaminate oil to purify and both this changing of filter and the process for building the filter can easily be provided as an automated process.

Tests have been performed for measuring the effectiveness of filtering using a depth filter in combination with the purification method using the separation aid as described above. From these tests it is clear that the method is very effective and even very small seized particles are effectively removed. Details are given below from two example tests:

1. A mineral based hydraulic oil, Exxon Mobil DTE 25, was treated according to the invention. The separation aid was mixed in the hydraulic oil in a mixing tank and stirred for 1 hour. Cellulose filter powder having a bulk density of 35 g/l and a fiber size distribution of 85%>32 um and 50%>90 um, was added into a small part of the separation aid and oil mixture and passed through a carrier paper creating a filter cake having a height of 6 cm. The oil mixture with the separation aid was then filtered through the built depth filter. The cleaning efficiency was evaluated by measuring the number of particles using image analysis (ISO 4406:87) before and after the cleaning. The filtering reduced the number of particles 99%, specifically from 1041 particles/ml (ISO-code 17/16/16) down to 9 particles/ml (ISO-code 10/8/7).

2. A sample of a virgin mineral based hydraulic oil, RecondOil ROCCO Hydraulic HLP 46, was taken from a metal drum and treated according to the invention. The separation aid was mixed in the hydraulic oil in a mixing tank and stirred for 4 hour. Cellulose filter powder having a bulk density of 55 g/l and a fiber size distribution of 75%>32 um and 10%>90 um, was added into a small part of the separation aid and oil mixture and passed through a carrier paper creating a filter cake having a height of 9 cm. The oil mixture with the separation aid was then filtered through the built depth filter. The cleaning efficiency was evaluated by measuring the number of particles using image analysis (ISO 4406:87) before and after the cleaning. The filtering reduced the number of particles by 98%, specifically from 105 particles/ml (ISO-code 14/12/11) down to 2.1 particles/ml (ISO-code 8/7/6).

Figure 2:
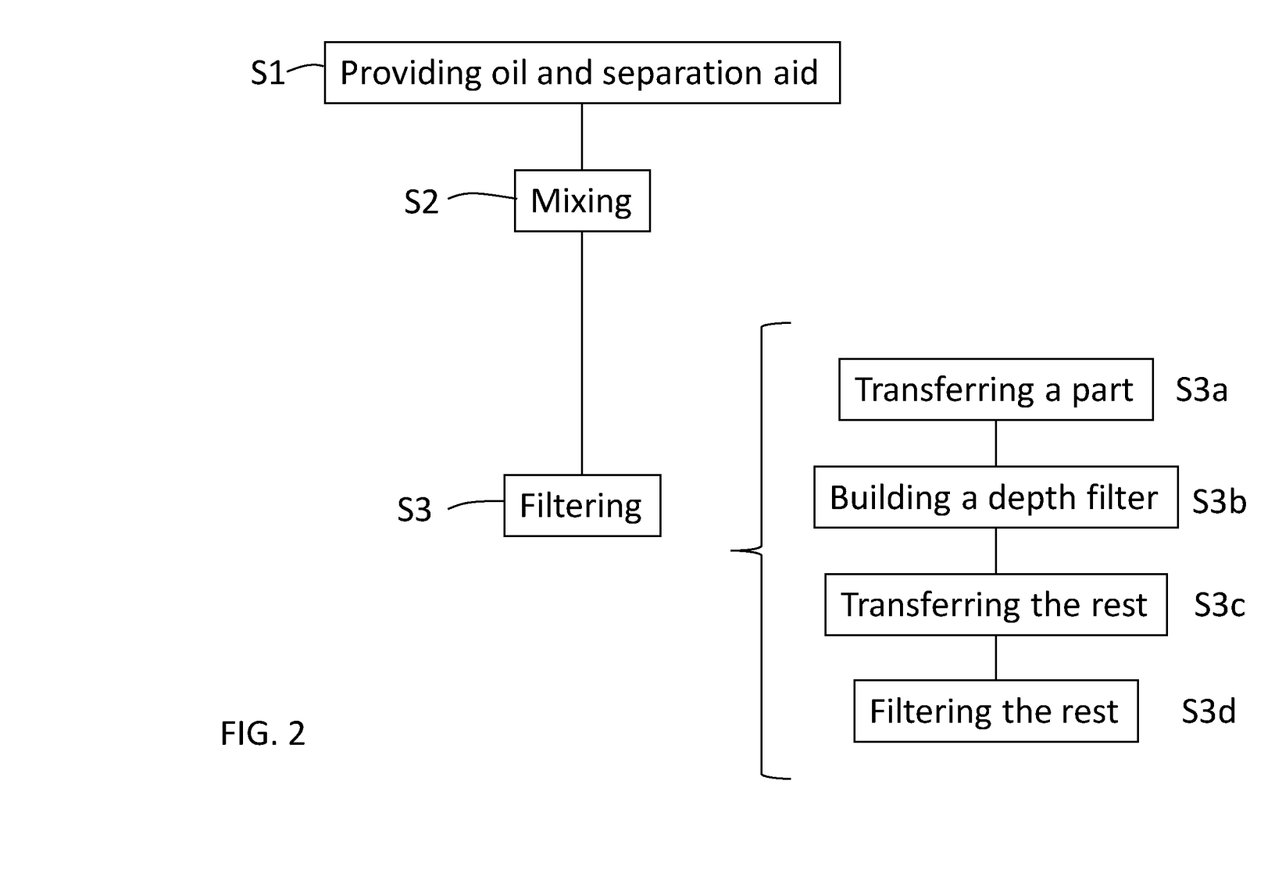
FIG. 2 is a flow chart of a method according to one embodiment of the invention.

FIG. 2 is a flow chart of a method according to one embodiment of the invention. The steps are described in order below:

S1: Providing contaminated oil and a separation aid to a mixing tank 3.

S2: Mixing said separation aid and contaminated oil into a mixture.

S3: Filtering said mixture. The mixture is transferred out from the mixing tank to a filtering arrangement 17 where it is filtered. In some embodiments of the invention said step of filtering comprises filtering said mixture through a depth filter 21 which has been described above. Said depth filter 21 can be built for each batch of contaminated oil to be purified. Building a depth filter 21 can for example be done by circulating a mix of cellulose fiber powder and filter building oil over a carrier paper 27 and possibly adding more cellulose fiber powder during circulation until a filter cake of the depth filter 21 is large enough for filtering the mixture of contaminated oil and separation aid, i.e. the batch of contaminated oil provided in the mixing tank 3 together with the separation aid. A filter building oil can be a small part of the contaminated oil to be purified or a small part of the mixture of the contaminated oil and separation aid from the mixing tank 3. Another specifically dedicated filter building oil could alternatively also be used for the building of the depth filter 21. Alternatively a commercially available depth filter can be used or a depth filter can be built by dry application of cellulose fiber powder on a carrier paper as explained above.

In one specific embodiment the step S3 of filtering comprises the steps:

S3*a*: Transferring first only a part of said mixture of separation aid and contaminated oil from the mixing tank 3 to a filtering arrangement 17.

S3*b*: Building a depth filter 21 by adding a cellulose fiber powder to said part of said mixture and circulating said part of said mixture with added cellulose fiber powder over a carrier layer 27 provided in the filtering arrangement 17 and possibly adding more cellulose fiber powder during circulation.

S3*c*: Transferring the rest of said mixture to said filtering arrangement 17.

S3*d*: Filtering the rest of the mixture through the built depth filter 21.

In some embodiments of the invention the method further comprises the step of measuring a degree of contamination of the contaminated oil provided to the mixing tank 3. In such embodiments the step of building a depth filter 21 may comprise adding an amount of cellulose fiber powder which is dependent on the measured degree of contamination of the contaminated oil provided to the mixing tank.

In some embodiments of the invention the method further comprises the step of warming the contaminated oil and separation aid when provided into the mixing tank 3. By warming the content in the mixing tank 3 binding of contaminants to the separation aid may be improved and speeded up and also the filtering may be more effective if the mixture is warm.

A computer program product is furthermore provided. Said computer program comprising instructions which, when executed in a processor 32 in the control system 31 in the system 1 for purification, cause the control system to control the flows in the system as described above. The computer program comprises at least instructions, which when executed in the processor 32 in the control system 31, cause the control system to control the system to perform the method according to the steps S1-S3 as described above. In one specific embodiment S3 comprises S3*a*-S3*d*.

The invention claimed is:

1. A method for purification of contaminated oil, comprising:
   providing contaminated oil and a liquid separation aid in a mixing tank;
   mixing the separation aid and the contaminated oil into a mixture; and
   filtering the mixture.

2. The method according to claim 1, wherein the filtering step comprises filtering said mixture through a depth filter without waiting for the separation aid and contaminants in the contaminated oil to sediment to a bottom phase such that the separation aid and the contaminants, both as free contaminants and as aggregates together with the separation aid, are trapped in the depth filter while the mixture is filtered through the depth filter to purify the contaminated oil into purified oil.

3. The method according to claim 2, wherein the filtering step further comprises:
   building the depth filter by circulating a mix of cellulose fiber powder and filter building oil over a carrier layer until a filter cake of the depth filter is large enough for filtering the mixture of the contaminated oil and the separation aid;
   filtering the mixture through the built depth filter.

4. The method according to claim 2, wherein the filtering step further comprises:
   transferring a first portion of the mixture from the mixing tank to a filtering arrangement;
   building the depth filter by adding a cellulose fiber powder to said first portion of the mixture and circulating said first portion of the mixture with added cellulose fiber powder over a carrier layer provided in the filtering arrangement;
   transferring a second portion of the mixture that does not contain added cellulose fiber powder to the filtering arrangement; and
   filtering the second portion of the mixture through the built depth filter.

5. The method according to claim 3, wherein the step of building a depth filter comprises adding an amount of the cellulose fiber powder which is at least 1.5 times the weight of the separation aid provided in the mixing tank.

6. The method according to claim 3, further comprising:
measuring a degree of contamination of the contaminated oil provided in the mixing tank,
wherein the step of building a depth filter comprises adding an amount of the cellulose fiber powder in accordance with the measured degree of contamination of the contaminated oil provided in the mixing tank.

7. The method according to claim 1, further comprising:
warming the contaminated oil and the separation aid when provided into the mixing tank.

8. A system for purification of contaminated oil, comprising:
a mixing tank comprising a mixing device, at least one inlet for receiving the contaminated oil and a liquid separation aid and at least one outlet for transferring a mixture of the contaminated oil and the separation aid out from the mixing tank;
a separation aid dosing device fluidly connected to the mixing tank for providing the liquid separation aid into the mixing tank; and
a filtering arrangement fluidly connected to the at least one outlet of the mixing tank and configured to filter the mixture while the mixture is being transferred out from the mixing tank without waiting for the separation aid and contaminations in the contaminated oil to sediment to a bottom phase such that the separation aid and the contaminants, both as free contaminants and as aggregates together with the separation aid, will be trapped in the filtering arrangement while the mixture is filtered through the filtering arrangement to purify the contaminated oil into purified oil.

9. The system according to claim 8, wherein the filtering arrangement comprises a depth filter.

10. The system according to claim 9, wherein the depth filter comprises a cellulose fiber powder and a carrier paper.

11. A system according to claim 8, wherein the filtering arrangement comprises:
a cellulose fiber mixing vessel arranged for receiving a filter building oil and a cellulose fiber powder;
a cellulose fiber source connected to the cellulose fiber mixing vessel; and
a carrier layer connected to the cellulose fiber mixing vessel and arranged such that the filter building oil and the cellulose fiber powder in the cellulose fiber mixing vessel can be circulated over the carrier layer to build a depth filter on the carrier layer,
wherein the filtering arrangement is configured to add the cellulose fiber powder from the cellulose fiber source to the cellulose fiber mixing vessel during the circulation until a filter cake of the depth filter is large enough to filter the mixture of the contaminated oil and the separation aid provided in the mixing tank.

12. The system according to claim 11, wherein:
the cellulose fiber mixing vessel is connected to the at least one outlet of the mixing tank,
the system is configured to transfer a first portion of the mixture from the mixing tank to the cellulose fiber mixing vessel, the first portion of the mixture constitutes the filter building oil,
the filtering arrangement is configured to add the cellulose fiber powder from the cellulose fiber source to the first portion of the mixture in the cellulose fiber mixing vessel and to circulate the mixture with added cellulose fiber powder over the carrier layer to build up the depth filter, and
the system is configured for transferring a second portion of the mixture from the mixing tank to the filtering arrangement and filtering the second portion through the built depth filter.

13. The system according to claim 11, wherein the filtering arrangement is configured to add an amount of the cellulose fiber powder to the cellulose fiber mixing vessel during building of the depth filter which is at least 1.5 times the weight of the separation aid provided in the mixing tank.

14. The system according to claim 11, further comprising:
a sensor configured to measure a degree of contamination of the contaminated oil provided in the mixing tank,
wherein the filtering arrangement is configured to adapt an amount of the cellulose fiber powder provided from the cellulose fiber source to the cellulose fiber mixing vessel in accordance with the measured degree of contamination of the contaminated oil provided in the mixing tank.

15. The system according to claim 8, further comprising a heating device provided in the mixing tank and configured to warm the contaminated oil and the separation aid in the mixing tank.

16. A non-transient computer-readable medium having instructions stored thereon which, when executed in a processor in a control device in a system for purification of oil, cause the control device to perform the method according to claim 1.

17. The method according to claim 2, wherein the separation aid is a liquid during the mixing and filtering steps and is at least substantially insoluble in the contaminated oil such that a two-phase mixture containing colloids is formed upon mixing the contaminated oil and the separation aid, the colloids being formed of droplets of the separation aid and absorbed contaminants, said contaminants being at least one of solid contaminants or dissolved impurities.

18. The method according to claim 17, wherein the separation aid comprises a polar polymer; a hydrotrope/solubilizer; and a co-tenside.

19. The method according to claim 18, wherein:
the polar polymer comprises a polyalkylene glycol, and
the hydrotrope/solubilizer comprises an anionic sulfonic acid, a phosphate ester-based substance or a non-ionic surfactant from the poly-glycoside family.

20. The method according to claim 19, wherein:
the co-tenside comprises sodium caprylimino dipropionate, and
the depth filter formed of cellulose fibers having a bulk density of 30-200 g/l and a fiber size distribution such that 30-90% of the cellulose fibers have a length greater than 32 um and up to 30% of the cellulose fibers have a length greater than 90 um.

* * * * *